United States Patent [19]

Lodder et al.

[11] Patent Number: 4,855,574
[45] Date of Patent: Aug. 8, 1989

[54] WELDING SLEEVE WITH CONNECTING MEANS HAVING AN UPPER AND LOWER PART

[75] Inventors: Bernard Lodder; Roelof Koopman, both of Hardenberg; Jan Visscher, Lutten, all of Netherlands

[73] Assignee: Wavin BV, Zwolle, Netherlands

[21] Appl. No.: 153,583

[22] Filed: Feb. 8, 1988

[30] Foreign Application Priority Data

Feb. 9, 1987 [NL] Netherlands ............... 8700299

[51] Int. Cl.⁴ ............................................. H05B 3/58
[52] U.S. Cl. ................................. 219/535; 156/304.2; 156/304.3; 219/544; 285/21
[58] Field of Search ............... 156/304.2, 304.3, 273.9; 219/544, 535; 285/292, 21

[56] References Cited

U.S. PATENT DOCUMENTS

| | | | |
|---|---|---|---|
| 3,597,591 | 8/1971 | Van Derlip | 219/544 |
| 3,798,419 | 3/1974 | Maake | 219/544 X |
| 3,808,573 | 4/1974 | Cappell | 219/544 X |
| 3,943,334 | 3/1976 | Sturm | 219/544 |
| 4,313,053 | 1/1982 | Sturm | 219/535 X |
| 4,634,844 | 1/1987 | Lodder et al. | 285/21 |
| 4,727,242 | 2/1988 | Barfield | 219/544 X |

FOREIGN PATENT DOCUMENTS 2136074  9/1984  United Kingdom ............ 156/273.9

Primary Examiner—Michael W. Ball
Assistant Examiner—Steven D. Maki
Attorney, Agent, or Firm—A. Robert Theibault

[57] ABSTRACT

Welding sleeve comprising electrically conductive material embedded in the thermoplastic material of the wall of said sleeve.

In a sleeve at least two connecting means are present which each comprise at least two metal parts which can cooperate in clamping contact with the electrically conductive material.

One metal part is inserted from the inside of the sleeve and one part from the outside; appropriate coaxial bores being present to allow passage of a pin on the lower part and the body of the upper part.

Upon mounting the upper part and lower part are connected with use of a force; the electrically conductive material is clampingly contacted.

The invention also relates to a method for forming a welding sleeve according to the invention and to an equipment for use in carrying out such a method.

7 Claims, 3 Drawing Sheets

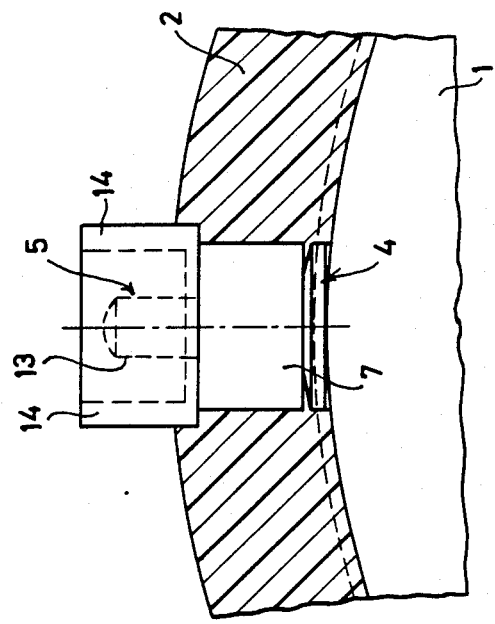
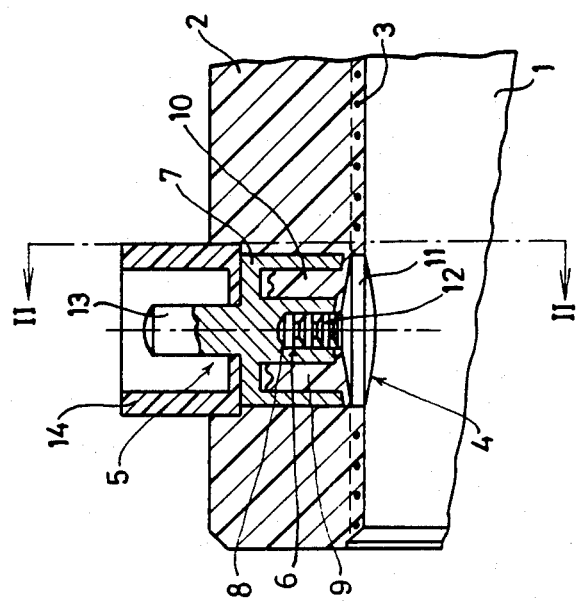

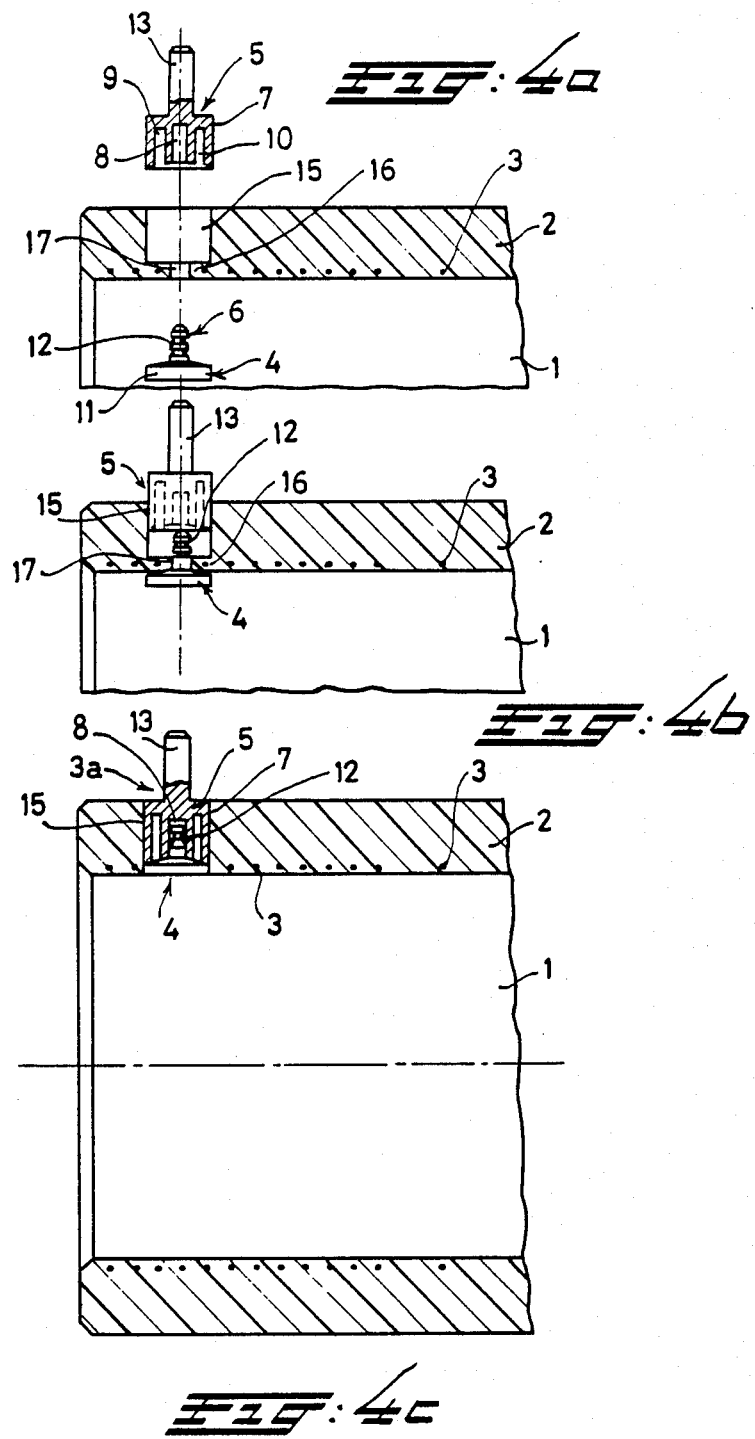

WELDING SLEEVE WITH CONNECTING MEANS HAVING AN UPPER AND LOWER PART

BACKGROUND OF THE INVENTION

The present invention relates to a welding sleeve made of a thermoplastic, the inside of which is provided, at least locally, with electrically conductive materials embedded in the wall and with at least two connecting means embedded in the sleeve wall for connecting the said electrically conductive material to an external voltage source, said connecting means extending maximally to the inner wall of the welding sleeve.

A welding sleeve of this type is generally known. For connecting tubes made of a thermoplastic with one another, the extremities of these tube parts are pushed into the welding sleeve, and this is followed by application of an electrical voltage to the electrically conductive material with a resistance such that the latter is heated under the influence of this voltage. The heat applied to the plastic causes the inside of the welding sleeve and the outside of the tube parts to be connected or to melt together. A strong, tight connection is obtained as a result.

The connecting means normally used are, for example, pins embedded in the wall of the welding sleeve, in the axial direction of the welding sleeve or perpendicularly to the axial direction of the welding sleeve whereby between two of such connecting means a desired length of electrically conductive material is present.

A disadvantage of this type is known welding sleeves resides in the fact that it is not always possible to guarantee a good electrical contact between said connecting means and the electrically conductive material as a result of which the percentage of failure in a batch of these known welding sleeves may be relatively high. Although it has indeed been attempted to overcome this drawback by welding the connecting means solidly to said electrically conductive material of the sleeve this is very troublesome and time-consuming and therefore virtually unfeasible in practice.

The object of the present invention is to provide a welding sleeve of the above mentioned type which does not have the said disadvantages and which has good electrical contact between the connecting means.

Another object of the invention is to provide a welding sleeve of this type, the connecting means being standardized in respect of positioning and shape.

SUMMARY OF THE INVENTION

The above objects are achieved, according to the invention, in that a welding sleeve of the type mentioned at the outset is characterized in that at least one of each connecting means comprises at least two metal parts of the connecting means interacting with each other and being in clamping contact with the electrically conductive material of the welding sleeve.

As will be illustrated further in the text hereinafter, the welding sleeve according to the invention comprises connecting means which are embodied and fitted such that the electrically conductive material is at all times in physical clamping contact with metal parts of the connecting means interacting with each other.

In particular, this applies when the parts of the connecting means of the welding sleeve according to the invention comprise an upper part of the connecting means inserted from the outer side of the welding sleeve in a hole in the wall thereof and a lower part of the connecting means is inserted from the inside of the welding sleeve. These parts of the connecting means are brought, with deformation of the plastic of the wall of the welding sleeve present between the parts, into interaction with each other, with the lower part of the connecting means being completely received in the wall of the welding sleeve.

The contact between the connecting means and the electrically conductive material is accordingly produced by directing a part of the connecting means from the inside of the welding sleeve into a through hole in the welding sleeve wall and by bringing another part from the outer side into the through hole. The through hole is made such that, when the two connecting means are brought into interaction with each other, the electrically conductive material is clamped between the said parts.

The parts of the connecting means are advantageously brought into interaction with each other by exerting a force during which the plastic wall present between the parts will undergo deformation.

In an advantageous embodiment of a welding sleeve according to the invention the lower part of the connecting means comprises a flange with a first pin present thereon, and the upper part of the connecting means comprises a body having open spaced which may receive the pin, on the one hand, and the plastic, undergoing deformation, of the walled section present between the lower and upper part of the connecting means before the parts are connected to one another.

The pin of the lower part of the connecting means and the space in which the pin must be received in the upper part of the connecting means are preferably cylindrical-symmetrical; the flange of the lower part and the body of the upper part preferably have essentially the same diameter.

In order to simplify the connection between the lower part of the connecting means and the upper part of the connecting means part the pin is preferably provided with one or more projecting ribs, as a result of which the force for bringing the two parts into force fit interaction with each other is reduced while at the same time an extremely good electrical contact between the two parts is nevertheless guaranteed.

The length of the pin of the lower part and the space in the upper part in which this pin must be received may be matched with each other such that between the upper part and the lower part a space remains so that the clamping action between the two parts does not become extremely high in order to prevent the electrically conductive material from undergoind excessive deformation during connection of the two parts.

In connection with the desired standardization, the upper part of the connecting means is particularly advantageously provided with a connecting part projecting outside the welding sleeve while the connecting pin is surrounded, if desired, by a protecting case connected with the welding sleeve wall.

In order to prevent errors on assembly of the connecting means the diameter of the connecting pin on the upper part of the connecting means is expediently larger than the diameter of the pin of the lower part of the connecting means. The diameter of the connecting pin of the upper part of the connecting means may of course also be substantially smaller than the diameter of the pin of the lower part of the connecting means.

The invention also relates to a method for forming a welding sleeve made of a thermoplastic and provided with at least two means for connecting electrically conductive material according to the inveniton, present in the wall of the welding sleeve, to an external voltage source, which is characterized in that the wall of a welding sleeve is locally bored through, the through hole comprising a lower and an upper hole in which the lower hole the pin of a lower part of the connecting means may be passed through from one side and in the upper hole the body of an upper part of the connecting means may be passed through from the other side. A wall section of the welding sleeve remains between the holes, in which the electrically conductive material is present, and, after fitting the lower and upper part of the connecting means these are connected with each other by exerting a force, such that the pin of the lower part of the connecting means and plastic, undergoing deformation, of the wall of the welding sleeve are received in the space(s) in the body of the upper part of the connecting means, while, if desired, the plastic is heated before and/or during the fitting and connection of the connecting means.

Finally, the invention relates to equipment for use in carrying out the method according to the invention described above.

Equipment of this type comprises, according to the invention, a drilling tool provided with a bit of which an end section located nearest to the free extremity has a smaller outer diameter than a subsequent material-working section having a material-working surface extending transversely to the end section.

As will become clear later, only the end section of the said equipment is to be considered a bit while the subsequent larger-diameter material-working section further away from the end acts as a surface-milling machine.

DETAILED DESCRIPTION OF THE DRAWINGS

The invention will now be illustrated by an exemplary embodiment with reference to the drawing, in which:

FIG. 1 shows part of a longitudinal section of a welding sleeve according to the invention with a set of parts of the connecting means fitted therein;

FIG. 2 shows a cross section through a welding sleeve according to the invention along line II—II;

FIGS. 4a to 4c show the various steps in attachinging the connecting means according to the invention to the wall of a welding sleeve.

Figure 3:
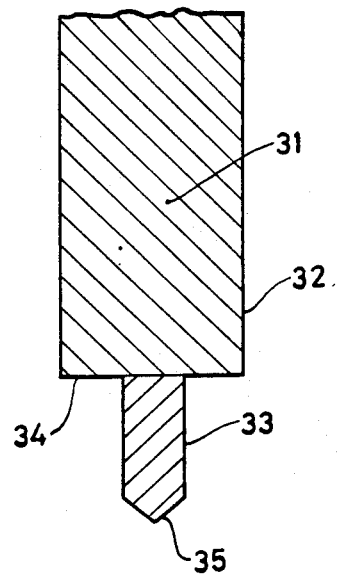
FIG. 3 shows equipment for use in carrying out the method according to the invention.

FIG. 1 shows part of a welding sleeve 1 having a wall 2 and electrical wire conductors 3 provided with connecting means 3a fitted through a hole in the wall. The connecting means 3a are formed by a lower connecting part 4 and an upper part of the connecting means 5, the lower part of the connecting means 4 consisting of a flat flange 11 having a pin 6 thereon and the upper part of the connecting means 5 consisting of a body 7 containing a cavity 8 as well as cavities 9 and 10. During connecting of the connecting means 4 and 5 with each other the pin 6 is received in clamping fashion in cavity 8, directed into the cavity while the electrically conductive wires 3 are enclosed in clamping fashion between the metal parts 4 and 5, interacting with each other, and specifically between the flange 11 and the body 7 of the two parts. During forming of the connection between the parts 4 and 5 the plastic of the wall section 16 which remains after forming of the lower hole 17 and upper hole 15 will be received, while undergoing deformation or plastic flow, in the spaces 9 and 10 likewise present inside the body 7 of the upper part of the connecting means 5. In many cases it will be preferable to heat the plastic during fitting of the two parts of the connecting means 4 and 5 shown such that flow of the plastic is promoted. At least one and preferably both parts of the connecting means 4, 5 are expediently preheated on insertion into the holes 17, 18 in order to promote flow of the plastic without directly heating the welding sleeve itself. This heating of the parts of the connecting means 4, 5 preferably takes place before the parts 4, 5 are inserted in the holes but it is self-evident that the parts 4, 5 can also be heated when they are fitted in the holes.

As shown, the lower part 4 of the connecting means comprises a connecting pin 6 provided with one or more ribs 12 which facilitates insertion of the pin 6 in the space 8 of the upper part 5 while a good electrical contact between parts 4 and 5 is guaranteed.

A protecting case 14 is expediently provided around the connecting pin 13. The protecting case 14 may be connected by welding to the wall 2 of the welding sleeve. In the drawing, the outer diameter of the protecting case 14 is larger than the outer diameter of the body 7 of the upper part of the connecting means 5. It is self-evident that equally good results are obtained when the outer diameter of the protecting case 14 is as large as the outer diameter of the body 7 of the upper part of the connecting means 5. In one welding sleeve according to the invention generally two connecting means are present each of these means comprising a lower part 4 and an upper part 5. Between said two connecting means a desired length of electrically conductive material is present, which material when connected to an external voltage source will provide the necessary heat to weld the tube ends and the welding sleeve together to form an air or liquid tight connection.

FIG. 3 shows schematically a tool to be used during forming the through-hole having a lower and an upper hole in the wall of a welding sleeve. The tool is indicated as a bit 31 having an end section of small diameter 33 and a subsequent material-working section having a large diameter 32. The diameter of the material-working section 32 corresponds to the outer diameter of the body 7 of an upper part of the connecting means to be used and the diameter of the section 33 corresponds to the diameter of the pin of a lower part of the connecting means to be used. The end section 33 is embodied as a bit while the material-working section 32 is essentially a surface-milling device, the milling surface being designated 34. During forming a suitable through-hole in the wall 2 of a welding sleeve to be provided with connecting means, a hole is bored by means of bit 31 having a tip 35, the end section 33 of the bit completely drilling through the wall and the material-working surface 34 extending transversely to the end section 33 milling the material from the wall to a small distance above the surface in which the electrically conductive material of the welding sleeve is present. The plastic present in the wall section 16 thus remaining will undergo deformation and/or flow during fitting of the two parts of the connecting means and may be received in spaces which are present in the upper part of the connecting means and are not occupied by the pin of the lower part of the connecting means.

FIG. 4 is a schematic representation of the steps carried out during fitting the parts of the connecting means 4 and 5 in a through hole, having an upper hole 15 and a lower hole 17 fitted in the wall of a welding sleeve. In FIG. 4a, a through hole is represented having a lower hole 17 in which the pin 6 of the lower part fits and an upper hole 15 in which the body 7 of the upper part of the connecting means 5 fits. The diameters of the two holes 15, 17 are advantageously somewhat smaller than the diameter of the part of the connecting means 7 or 6, to be recieved therein, in order to guarantee tight clamping connection. The lower part of the connecting means is moved upward from the inside of the welding sleeve, the pin 6 being received in the lower hole 17, and the upper part 5 moved into the upper hole 15. In FIG. 4b, the two parts of the connecting means 4 and 5 are shown close to each other while FIG. 4c shows the state of the two parts of the connecting means 4 and 5 after having been pushed into each other by a force fit, the pin 6 being received in the space 8 of the part of the connecting means 5, and the wires of the electrically conductive material being clampingly enclosed between the parts 4 and 5 of the connecting means. In the embodiment described here, the protecting case 14 for the connecting pin 13 is not shown; it is self-evident that a protecting case 14 can also be provided here.

In the examples given above, the positioning of the parts of the connecting means 4, 5 and the length of the connecting pin 13 projecting outside the sleeve as well as the diameter thereof are advantageously standardized. The ratio of the outer diameter of the connecting pin 13 to the diameter of the hole in protecting case 14 is standardized, guaranteeing problem-free connection of, for example, contact plugs.

As mentioned hereinbefore, it is ensured in an advantageous embodiment of the connecting means discussed above that the length of the pin 6 be larger by a maximal value equal to the thickness of the electrically conductive material 3 than the depth of the space 8 in the upper part of the connecting means 5.

This is particularly important if the electrically conductive material used is softer than the material of the parts of the connecting means. In this embodiment of the connecting means it is advantageous to maintain a small layer of plastic between the parts of the connecting means, this layer forming a connection between the plastic material received in the spaces in part 5 and the surrounding material of the original sleeve.

The vulnerability of the connecting means is as a result considerably reduced.

Expediently in all embodiments described the material used for manufacturing of upper part 5 and lower part 4 of the connecting means according to the invention is brass.

What is claimed is:

1. A thermoplastic welding sleeve the inside of which is locally provided with electrically conductive material embedded in a wall thereof, at least two connecting means embedded in said wall thereof, at least tow connecting means embedded in said wall for connecting said electrically conductive material to an external voltage source, said connecting means extending maximally to the inner wall of said welding sleeve, at least one of each of said connecting means comprising at least two upper and lower metal parts and interacting with each other and being in contact with the electrically conducting material of said welding sleeve and said electrically conducting material being clamped between said metal parts of said conneting means, said upper metal part being inserted from the outer side of the welding sleeve through a hole through the wall thereof, said lower part of the connecting means being inserted from the inside of said welding sleeve with plastic of the wall of said welding sleeve present between said upper and lower metal parts, said upper and lower parts of said connecting means being brought into physical electrical contact with one another through deformation of the plastic wall of said slleve present between said parts and said parts being forced into contact with each other the lower part of the conneting means being completely received within the wall of the said welding sleeve, and said connecting means comprising the lower part of the connecting means having a flange provided with one or more projecting parts as well as the upper part of the connecting means having a body provided with one or more spaces in which said projecting parts are received in clamping fashion while deformed plastic of the wall of the welding sleeve is received in at least some of the spaces in the upper part of the connecting means parts.

2. A welding sleeve as claimed in claim 1, in which the lower part of the connecting means comprises a flat flange having a pin which clampingly fits in a space present in the body of the upper parts of the connecting means.

3. A welding sleeve according to claim 1, in which the lower and upper part of the connecting means are embodied to be cylindrical-symmetrical, and the flange of the lower part of the connecting means and the body of the upper part of the connecting means have essenitially the same diameter.

4. A weld sleeve according to claim 2, in which the pin of the lower part of the connecting means is provided with one or more projecting ribs.

5. A welding sleeve according to claim 1, in which the upper part of the connecting means is provided with a connection pin projecting outside the welding sleeve and the lower part is provided with a pin.

6. A welding sleeve according to claim 5, in which the connecting pin is surrounded by a protecting case connected by welding to the welding sleeve wall.

7. A welding sleeve according to claim 5, in which the connecting pin of the upper part has a diameter which is larger than the diameter of the pin of the lower part of the connecting means.

* * * * *